US012705534B2

(12) United States Patent
Peng et al.

(10) Patent No.: US 12,705,534 B2
(45) Date of Patent: Aug. 11, 2026

(54) METHOD FOR GENERATING MODEL USING TRAINING DATA, AND ELECTRONIC DEVICE

(71) Applicant: BEIJING BAIDU NETCOM SCIENCE TECHNOLOGY CO., LTD, Beijing (CN)

(72) Inventors: Hanyu Peng, Beijing (CN); Weiguo Pian, Beijing (CN); Mingming Sun, Beijing (CN); Ping Li, Beijing (CN)

(73) Assignee: BEIJING BAIDU NETCOM SCIENCE TECHNOLOGY CO., LTD, Beijing (CN)

( * ) Notice: Subject to any disclaimer, the term of this patent is extended or adjusted under 35 U.S.C. 154(b) by 837 days.

(21) Appl. No.: 18/080,549

(22) Filed: Dec. 13, 2022

(65) Prior Publication Data

US 2023/0113019 A1 Apr. 13, 2023

(30) Foreign Application Priority Data

Jan. 6, 2022 (CN) ......................... 202210008551.7

(51) Int. Cl.
*G06N 20/00* (2019.01)

(52) U.S. Cl.
CPC .................................... *G06N 20/00* (2019.01)

(58) Field of Classification Search
CPC ........... G06N 20/00; G06N 3/08; Y02T 10/40
See application file for complete search history.

(56) References Cited

U.S. PATENT DOCUMENTS

| | | | | |
|---|---|---|---|---|
| 11,915,419 | B1 * | 2/2024 | Behrooz | G16H 30/40 |
| 2021/0357776 | A1 | 11/2021 | Quader et al. | |
| 2022/0083840 | A1 * | 3/2022 | Luong | G06N 3/088 |
| 2022/0180882 | A1 * | 6/2022 | Wang | G10L 21/0272 |
| 2023/0409911 | A1 * | 12/2023 | Obinata | G06N 3/0464 |

FOREIGN PATENT DOCUMENTS

| | | |
|---|---|---|
| CN | 111814816 A | 10/2020 |
| CN | 112183321 A | 1/2021 |

OTHER PUBLICATIONS

Cao et al. ("Sotnax Cross Entropy Loss with Unbiased Decision Boundary for Image Classification", IEEE, 2018, pp. 2028-2032).*
Shim et al. (Data Augmentation and Semi-supervised Learning for Deep Neural Networks-based Text Classifier, ACM , 2020, pp. 1119-1126).*
OA for CN application 202210008551, Jan. 18, 2023.

* cited by examiner

*Primary Examiner* — Jennifer N Welch
(74) *Attorney, Agent, or Firm* — Lippes Mathias LLP

(57) ABSTRACT

A method for generating a model includes: obtaining training data for training a target model, in which the training data includes labeled data and unlabeled data; obtaining a first output result by the target model based on the labeled data; obtaining a second output result by the target model based on the unlabeled data; and obtaining an optimized target model by optimizing the target model based on the first output result and the second output result.

14 Claims, 4 Drawing Sheets

METHOD FOR GENERATING MODEL USING TRAINING DATA, AND ELECTRONIC DEVICE

CROSS-REFERENCE TO RELATED APPLICATIONS

This application is based on and claims priority to Chinese Patent Application No. 202210008551.7, filed on Jan. 6, 2022, the entire contents of which are incorporated herein by reference for all purposes.

TECHNICAL FIELD

The disclosure relates to the field of computer technology, in particular to the field of artificial intelligence such as computer vision and deep learning.

BACKGROUND

With the development of computer technology, the development speed of computer model technology and the number of application scenarios are rapidly increasing. In order to obtain better computer models, the data used to train the models is important. However, as the data used for training models needs to be correctly labelled in order for the models to learn the information they need to master, data labelling is often tedious and even requires more labor, which inevitably affects the cost and speed optimization of model training.

SUMMARY

According to a first aspect, the disclosure provides a method for generating a model. The method includes:

obtaining training data for training a target model, in which the training data includes labeled data and unlabeled data;

obtaining a first output result by the target model based on the labeled data;

obtaining a second output result by the target model based on the unlabeled data; and obtaining an optimized target model by optimizing the target model based on the first output result and the second output result.

According to a second aspect, the disclosure provides an electronic device. The electronic device includes: at least one processor and a memory communicatively coupled to the at least one processor. The memory stores instructions executable by the at least one processor, and when the instructions are executed by the at least one processor, the at least one processor is caused to implement the method according to any embodiment of the disclosure.

According to a third aspect of the disclosure, a non-transitory computer-readable storage medium storing computer instructions is provided. The computer instructions are configured to cause a computer to implement the method according to any embodiment of the disclosure.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Figure 1:
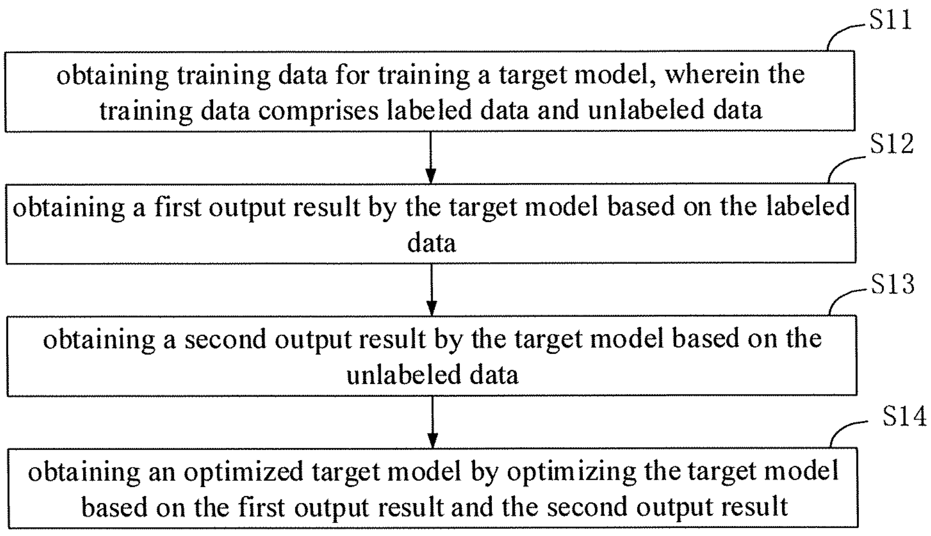
FIG. 1 is a schematic diagram of a method for generating a model according to an embodiment of the disclosure.

According to embodiments of the disclosure, a method for generating a model is provided. FIG. 1 is a schematic diagram of the method for generating a model according to the embodiment of the disclosure. The method can be applied to an electronic device that can execute instructions using a front-end or back-end. For example, the apparatus can be deployed on a terminal or a server or other processing devices to perform steps such as acquisition of training data and optimization of the target model. The terminal may be a User Equipment (UE), a mobile device, a cellular phone, a cordless phone, a Personal Digital Assistant (PDA), a handheld device, a computing device, an in-vehicle device, or a wearable device. In some possible implementations, the method can also be implemented by calling computer-readable instructions stored in a memory via a processor. As illustrated in FIG. 1, the method for generating a model includes the following steps.

At step S11, training data for training a target model is obtained, in which the training data includes labeled data and unlabeled data.

At step S12, a first output result is obtained by the target model based on the labeled data.

At step S13, a second output result is obtained by the target model based on the unlabeled data.

At step S14, an optimized target model is obtained by optimizing the target model based on the first output result and the second output result.

In the embodiment, the target model may be a model for processing data such as image data, and vector data. For example, the target model may specifically be an image recognition model, an image generation model, a video processing model, an audio processing model, an image restoration model, and a special type of data processing model.

The target model may be an untrained model or a model that has undergone initial training and requires further optimization.

In a specific implementation, the training data may be image data. The target model may be an image data processing model.

The labeled data in the training data may include input data and labels of the input data. The labels of the input data are generated by labeling the input data, either at the time the input data is generated or by labeling the input data manually. The label of the input data is related to the purpose of the target model. For example, if the target model is used to recognize objects in images, the input data is images and the labels of the input data is object information. If the target model is used to recognize text, then the input data is text or input vectors transformed based on text and the labels of the input data is reference results of text recognition.

In the case where the target model is an image data processing model, the labeled data in the training data may be image data labeled with reference prediction information. The unlabeled data in the training data may be image data that does not have labels.

In detail, for example, the target model is used to identify a target object, and the labeled data in the training data may be images containing the target object, and the label represents that the target object is present in a target object area of the image of the labeled data. The unlabeled data in the training data may be an image containing the target object, and there is no label representing the target object in a target object area of the image of the unlabeled data.

For another example, the target model is used to identify image categories, and specifically may be used to identify image contents, such as people, animals, plants, buildings and natural scenes. The labeled data in the training data may be images that are labeled with category information. The unlabeled data in the training data may be images that are not labelled with category information.

Obtaining the first output result by the target model based on the labeled data may be inputting the labeled data into the target model and obtaining the first output result.

Obtaining the second output result by the target model based on the unlabeled data may be inputting the unlabeled data into the target model and obtaining the second output result.

In a specific implementation, the above steps S12 and S13 may be performed in any sequential order or may be performed simultaneously in no sequential order.

Obtaining the optimized target model by optimizing the target model based on the first output result and the second output result may include: obtaining a first target model by training the target model based on the first output result and the corresponding labels of the labeled data. The labels of the unlabeled data are obtained by inputting the unlabeled data into the first target model, and the first target model is further trained according to the second output result and the labels to obtain the optimized target model.

Obtaining the optimized target model by optimizing the target model based on the first output result and the second output result may include: obtaining the first output result and the second output result by the target model based on the labeled data and the unlabeled data; and obtaining the optimized target model by training the target model based on the first output result, the second output result and the labels of the labeled data.

In this embodiment, the target model can be trained according to the labeled data and the unlabeled data, to obtain the optimized target model. Thus, in the case of only having a limited amount of labeled data, the target model can still be trained, which reduces the requirements on data labeling during the model training process and improves the utilization rate of the limited amount of labeled data.

Figure 2:
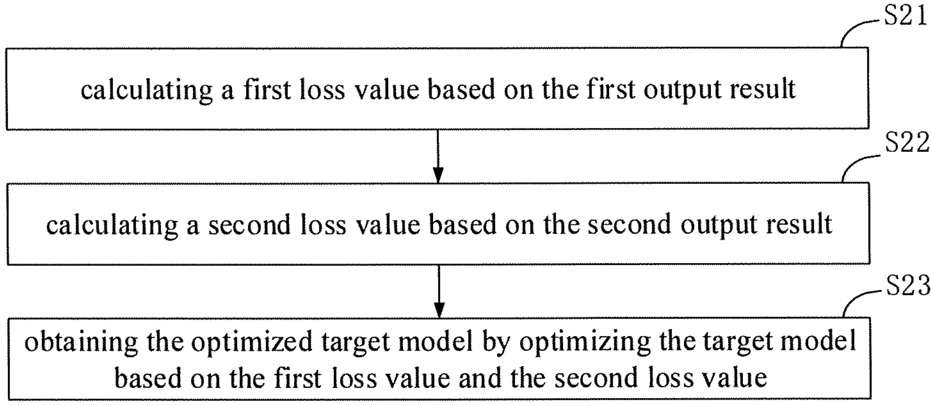
FIG. 2 is a schematic diagram of a method for generating a model according to another embodiment of the disclosure.

In an embodiment, obtaining the optimized target model by optimizing the target model based on the first output result and the second output result, as shown in FIG. 2, includes the following steps.

At step S21, a first loss value is calculated based on the first output result.

At step S22, a second loss value is calculated based on the second output result.

At step S23, the optimized target model is obtained by optimizing the target model based on the first loss value and the second loss value.

In a specific implementation, steps S21 and S22 may be performed in any sequential order or may be performed simultaneously in no sequential order.

In this embodiment, calculating the first loss value based on the first output result may be calculating the first loss value based on the first output result and the labels according to the general steps of model training. In a specific implementation, the first loss value may be determined by an internal function of the target model and parameters to be optimized of the target model.

In an implementation, calculating the second loss value based on the second output result may be calculating the second loss value based on the second output result and pseudo labels.

In a specific implementation, the pseudo labels may be obtained by the target model based on the unlabeled data.

In this embodiment, the first loss value and the second loss value are obtained from the first output result and the second output result respectively, and the target model is optimized according to the two loss values, so that the unlabeled data can also be used for model training, thereby reducing the amount of labelled data required for model training and learning process.

In an implementation, calculating the first loss value based on the first output result, includes:

calculating the first loss value based on a valid number of the labeled data, the first output result and labels for the labeled data, in which the valid number of the labeled data is calculated based on part of the labeled data satisfying a preset condition.

In this embodiment, the part of the labeled data that satisfies the preset condition may refer to the data in the labeled data whose quality satisfies certain requirements. For example, in the case where the target model is used to process image data, the labeled data includes images and labels of the images. The part of the labeled data that satisfies the preset condition may be part of the labeled data that has high image quality, for example, images with clear image quality, and images having complete contents without any blur.

For another example, in the case where the target model is used to process text information, the labeled data includes texts and labels of texts. The part of the labeled data that satisfies the preset condition may be text having complete contents and text composed of complete sentences.

In a specific implementation, the valid number of the labeled data may be calculated and determined according to the amount of the data whose quality satisfies certain requirements. The amount of data per copy of the labeled data may be counted as 1.

In the embodiment, the loss value is calculated based on the first output data, so that the limited amount of labeled data can be fully used in the following training process of the target model.

In an embodiment, calculating the second loss value based on the second output result, includes:

calculating the second loss value based on a valid number of the unlabeled data, the second output result and a weight factor for the unlabeled data, in which the valid number of the unlabeled data is calculated based on part of the unlabeled data satisfying a preset condition.

In the embodiment, the part of the unlabeled data satisfying the preset condition may refer to the data whose quality satisfies certain requirements in the unlabeled data. For example, in the case where the target model is used to process image data, the unlabeled data includes images. The part of unlabeled data satisfying the preset condition may be part of the data having high image quality, for example, clear images, and images having complete contents without any blur.

In the case that the target model is used to process text, the part of the unlabeled data satisfying the preset condition may be text that contains complete sentences.

Generally, the unlabeled data is obtained from real data, and the distribution of the unlabeled data is similar to the distribution of data in real world since it has not been labeled. The real data distribution often has a data long tail phenomenon, that is, when the amount of the sample tends to be infinity, the curve tends to infinitely close to a value in a decreasing speed. When the unlabeled data is used for training model, the model generalization ability is greatly affected because of unbalanced distribution of training data, and the generalization ability of the model after training is low. The effect is more obvious if the model is trained on an unbalanced training set but validated on a balanced test set. The trained model may perform poorly in the category with a small amount of samples, but well in the category with a large amount of samples. When there is a great difference between the amount of the labeled data and the amount of the unlabeled data, and the amount of the unlabeled data is much greater than the amount of the labeled data, after training with the unlabeled data and the labeled data, the imbalance performance of the model is more obvious.

In this embodiment, when the loss value is obtained from the unlabeled data, a preset weight factor may be applied to the loss value, so that the long tail distribution problem in the unlabeled data can be solved.

In an implementation, obtaining the optimized target model by optimizing the target model based on the first loss value and the second loss value, includes:

obtaining a total loss value based on the first loss value and the second loss value; and obtaining the optimized target model by optimizing the target model based on the total loss value.

Obtaining the total loss value based on the first loss value and the second loss value may be obtaining the total loss value by adding the first loss value and the second loss value together or performing a weighted adding on the first loss value and the second loss value.

In this embodiment, the target model is trained according to the total loss value obtained based on the first loss value and the second loss value, so that the effect of the labeled data and the unlabeled data can be brought into play, which reduces the requirements on the amount of labeled data for model training.

In an implementation, obtaining the training data for training the target model, includes:

obtaining labeled raw data and unlabeled raw data;

obtaining the labeled data by adding first noise information to the labeled raw data; and obtaining the unlabeled data by adding second noise information to the unlabeled raw data.

In this embodiment, the data enhancement function may be used for calculation on the labeled raw data and the unlabeled raw data respectively, and the labeled data and the unlabeled data may be obtained.

In this embodiment, the training data can be obtained by adding noise information to the raw data, which can improve the robustness of the target model after training.

In an implementation, the second noise information includes the first noise information and third noise information, and an interference intensity of the third noise information is greater than that of the first noise information.

In this embodiment, the unlabeled data with weak noise may be input into the target model, to obtain the pseudo labels. The unlabeled data with strong noise is input into the target model, to obtain predicted values. The predicted value is close to the pseudo label by regressing the pseudo label with the predicted value. In the process, the parameters to be optimized of the target model are further adjusted, thus the target model can produce the same predicted values for the data with strong noise and the data with weak noise, thereby improving the robustness of the model.

In a specific example of this disclosure, the target model is used to classify images. The data input into the target model or the optimized target model is image, and the output data of the target model or the optimized target model is scores corresponding to image categories. For example, for image A, the output data includes: a score corresponding to category a is 12, a score corresponding to category b is 15, and a score corresponding to category d is 80. The category with the highest score can be selected as the category corresponding to the input data of the target model. When training the target model, the given training data set is $\mathcal{D}^{s}=\mathcal{D}^{s,l}\cup\mathcal{D}^{s,u}$, which contains C categories, the data dimension of the vector data transformed from each image data in the training data set is d. In the training data set, the labeled data set is $$D^{s,l}=\{(x_i^{s,l},y_i^{s,l})\}_{i=1}^{N^{s,l}},$$

and the unlabeled data set is $$D^{s,u}=\{(x_j^{s,u},y_j^{s,u})\}_{j=1}^{N^{s,u}}.$$

Due to the high cost of labeling data, the amount of unlabeled data is usually much larger than the amount of labeled data, which means $N^{s,u}<<N^{s,l}$. The ratio of the unlabeled data to the labeled data is represented in this example as $$\gamma=\frac{N^{s,u}}{N^{s,l}}.$$

In the example, in the training set, the number of labeled data for each category is expressed as $$N_c^{s,l},$$

i.e., $$\Sigma_{c=1}^{C} N_c^{s,l} = N^{s,l}.$$

The degree of imbalance between the labeled data and the unlabeled data can be expressed as $$R^l = \frac{N_{max}^{s,l}}{N_{min}^{s,l}},$$

where $R^l >> 1$, $$N_{max}^{s,l} \text{ and } N_{min}^{s,l}$$

represent the maximum and minimum number of samples, respectively.

In a possible implementation, the validation set $\mathcal{D}^v$ and the test set $\mathcal{D}^t$ of the target model are balanced.

In this example, the valid number (the number of representative samples) of the labeled data set $\mathcal{D}^{s,l}$ in the training data may be defined as:

$$e_c^l = \left(1 - \beta^{N_c^{s,l}}\right) \Big/ (1 - \beta),$$

where $\beta = (N^{s,l} - 1)/N^{s,l}$. On this basis, the loss function of the labeled data may be expressed as:

$$CE_{softmax}(z^{s,l}, y^{s,l}) = -\frac{1-\beta}{1-\beta^{N_c^{s,l}}} \log\left(\frac{\exp(z_y^{s,l})}{\sum_{i=0}^{C} \exp(z_i^{s,l})}\right);$$

in which $z = f(x^{s,l}; \theta)$.

The valid number of the unlabeled data set $\mathcal{D}^{s,u}$ is $e^u = (1-\beta^{\hat{N}^{s,u}})/(1-\beta)$, in which $\beta = (\hat{N}^{s,u}-1)/\hat{N}^{s,u}$. On this basis, the loss function for the unlabeled data is:

$$\mathcal{L}_u = \frac{1}{B^u} \sum_{j=1}^{B^u} \frac{1-\beta}{1-\beta^{\hat{N}^{s,u}}} 1(\hat{y}_j^u \geq \tau) \mathcal{H}(\hat{y}_j^u, f(\mathcal{A}(x_j^u); \theta))$$

where, $\hat{N}^{s,u}$ (number of samples corresponding to the unlabeled data) is time dynamic, and thus $$\frac{1-\beta}{1-\beta^{\hat{N}^{s,u}}}$$

varies over time. The variable parameter of the target model is $\theta$, the function of the target model is expressed as: $f(\cdot;\theta)$, the total number of the labeled data and the unlabeled data in the training dataset are $N^{s,l}$ and $N^{s,u}$ respectively, the weak noise information is added to the raw training data by weak noise data enhancement function $\alpha(\cdot)$, and the strong noise information is added to the raw training data by strong noise data enhancement function $\mathcal{A}(\cdot)$. The $\mathcal{H}(\cdot,\cdot)$ in the expression above represents a cross-entropy loss function, $1(\ )$ in the expression above is a conditional threshold function, and r in the expression above is the threshold. The total loss function for both the labeled data and the unlabeled data may be expressed as:

$$\mathcal{L} = \frac{1}{B^l} \sum_{i=1}^{B^u} \frac{1-\beta}{1-\beta^{N_c^{s,l}}} \mathcal{H}(y_i^l, f(\alpha(x_i^l); \theta)) + \lambda \frac{1}{B^u} \sum_{j=1}^{B^u} \frac{1-\beta}{1-\beta^{\hat{N}^{s,u}}} 1(\hat{y}_1^u \geq \tau) \mathcal{H}(\hat{y}_j^u, f(A(x_j^u); \theta)).$$

where $\lambda$ in the above expression is the weight factor.

In the labeled dataset, the valid number $$e_c^l$$

of category c is calculated by $$e_c^l = \left(1 - \beta^{N_c^{s,l}}\right) \Big/ (1 - \beta),$$

where $\beta = (N^{s,l} - 1)/N^{s,l}$.

According to the loss function, the updated parameter $\hat{\theta}$ of the target model is obtained.

Suppose that the batch contained in the labeled data with $B^l$ data is $\mathcal{X}$ and the batch contained in the unlabeled data with $B^u$ data is $\mathcal{U}$, for each sample $$x_i^l$$

of the labeled data in $\mathcal{X}$ and its label $$y_i^l,$$

the input data is:

$$\tilde{x}_i^l = \alpha(x_i^l);$$

the output data is:

$$\tilde{y}_i^l = f(\tilde{x}_i^l; \theta).$$

For each sample $$x_j^u$$

in $\mathcal{U}$, the input data includes the first input data $$\tilde{x}_j^u = \alpha(x_j^u)$$

with added weak noise information (equivalent to the first noise information of the embodiment above), and the second input data $$\hat{x}_j^u = \mathcal{A}(x_j^u)$$

with added strong noise information (equivalent to the third noise information of the aforementioned embodiment).

For the first input data, the obtained first output data is $$y_j^u = f(\tilde{x}_j^u; \theta).$$

For the second input data, the obtained second output data is $$\hat{y}_j^u = \text{argmax}(y_j^u),$$

that is, the second output data is the maximum value of the scores corresponding to respective categories. For the second output data, $$\hat{N}_c^{s,u} = \sum_{j=1}^{B^u} 1(\hat{y}_j^u = c) \text{ and } \hat{N}^{s,u} = \sum_{c=0}^{C} \hat{N}_c^{s,u}.$$

The valid number of the second input data is: $e^u=(1-\beta^{\hat{N}^{s,u}})/(1-\beta)$.

According to the output data of the labeled data, the loss value obtained may be calculated by the following expression:

$$\mathcal{L}_s = \frac{1}{B^l} \sum_{i=1}^{B^l} \frac{1}{e_c^l} \mathcal{H}(y_i^l, \tilde{y}_i^l).$$

The loss function of the output data corresponding to the unlabeled data is $$\mathcal{L}_u = \frac{1}{B^u} \sum_{j=1}^{B^u} \frac{1}{e^u} 1(\hat{y}_j^u \geq \tau) \mathcal{H}(\hat{y}_j^u, f(\hat{x}_j^u; \theta)).$$

The optimized parameter of the target model is $\hat{\theta} \leftarrow \theta - \nabla_\theta(\mathcal{L}_s + \mathcal{L}_u)$.

Figure 3:
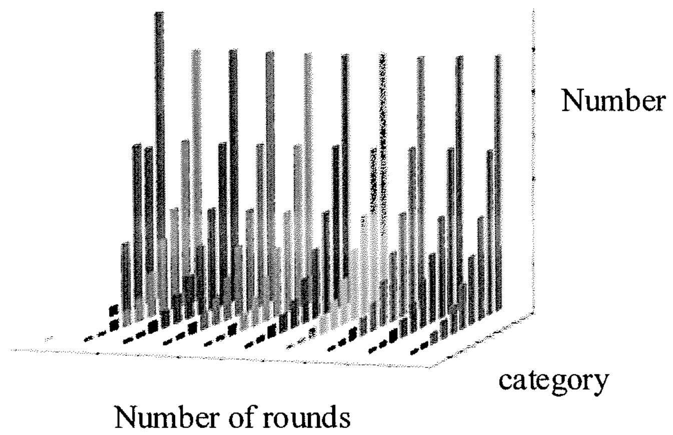
FIG. 3 is a schematic diagram of an amount of output data corresponding to each category during training of a target model according to an example embodiment of the disclosure.
Figure 4:
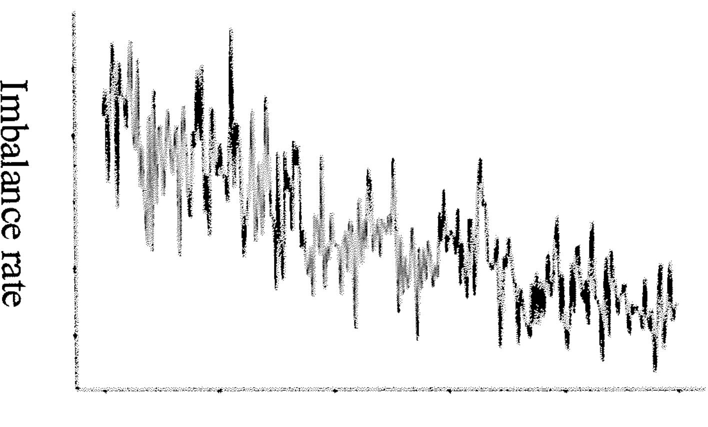
FIG. 4 is a schematic diagram of the effect of decreasing an imbalance rate of the target model trained by the method for generating a model as a number of training rounds increases according to an example embodiment of the disclosure.

As can be seen from FIG. 3, the optimized target model is obtained according to the method for generating a model provided in this embodiment, with the increase of the number of training rounds, the output data of each category is kept basically unchanged, which not only improves the utilization of labeled data, but also improves the stability of the model. Moreover, it can be seen from FIG. 4 that, with the method for generating the model provided by embodiments of the present disclosure, the unbalance rate of unlabeled data decreases with the increase of training rounds on the horizontal axis, and the model stability is high.

Figure 5:
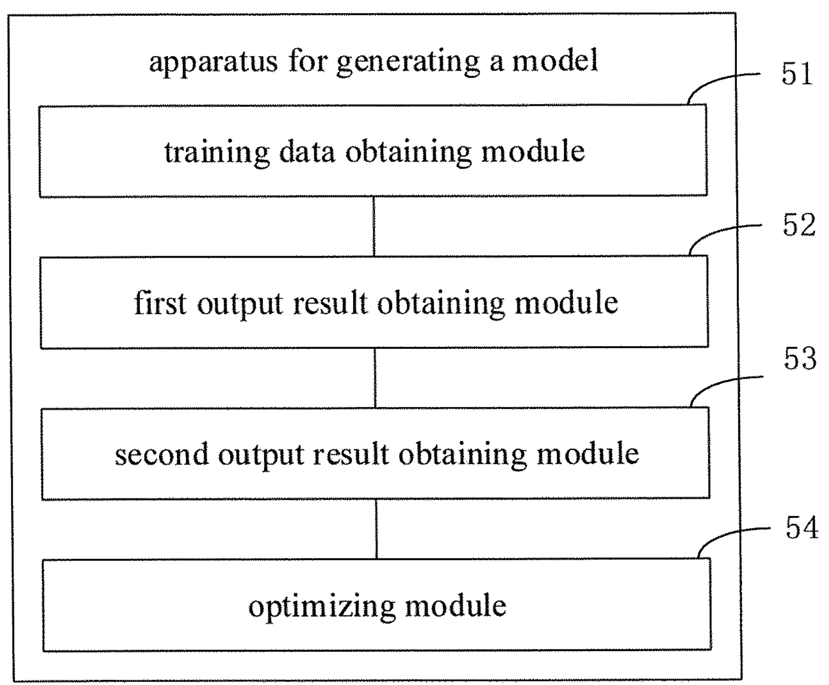
FIG. 5 is a schematic diagram of an apparatus for generating a model according to an embodiment of the disclosure.

Embodiments of the disclosure also provide an apparatus for generating a model. As shown in FIG. 5, the apparatus includes: a training data obtaining module 51, a first output result obtaining module 52, a second output result obtaining module 53 and an optimizing module 54.

The training data obtaining module 51 is configured to obtain training data for training a target model, in which the training data includes labeled data and unlabeled data.

The first output result obtaining module 52 is configured to obtain a first output result by the target model based on the labeled data.

The second output result obtaining module 53 is configured to obtain a second output result by the target model based on the unlabeled data.

The optimizing module 54 is configured to obtain an optimized target model by optimizing the target model based on the first output result and the second output result.

Figure 6:
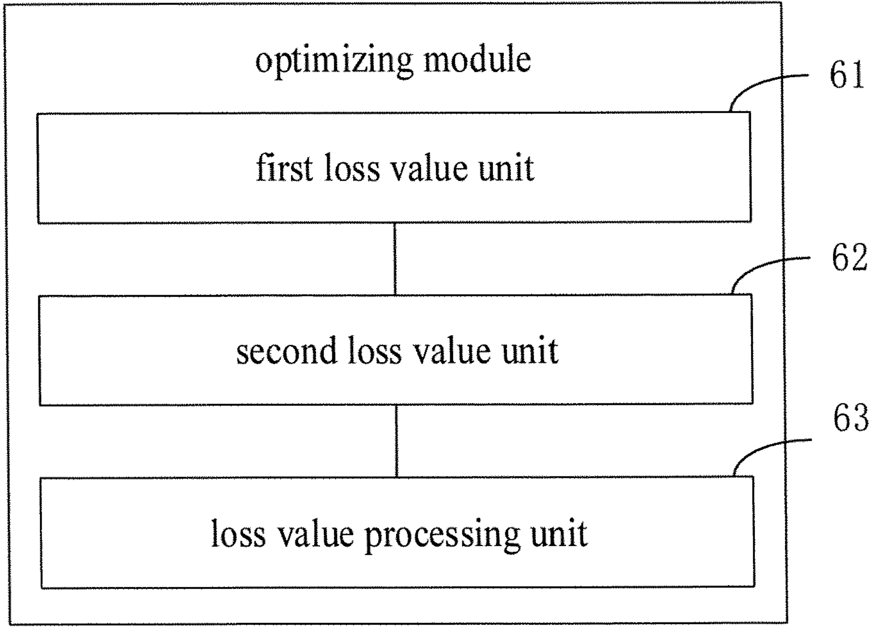
FIG. 6 is a schematic diagram of an apparatus for generating a model according to another embodiment of the disclosure.

In an implementation, as shown in FIG. 6, the optimizing module includes: a first loss value unit 61, a second loss value unit 62 and a loss value processing unit 63.

The first loss value unit 61 is configured to calculate a first loss value based on the first output result.

The second loss value unit 62 is configured to calculate a second loss value based on the second output result.

The loss value processing unit 63 is configured to obtain the optimized target model by optimizing the target model based on the first loss value and the second loss value.

In an implementation, the first loss value unit is further configured to:

calculate the first loss value based on a valid number of the labeled data, the first output result and labels for the labeled data, in which the valid number of the labeled data is calculated based on part of the labeled data satisfying a preset condition.

In an implementation, the second loss value unit is further configured to:

calculate the second loss value based on a valid number of the unlabeled data, the second output result and a weight factor for the unlabeled data, in which the valid number of the unlabeled data is calculated based on part of the unlabeled data satisfying a preset condition.

In an implementation, the loss value processing unit is further configured to:

obtain a total loss value based on the first loss value and the second loss value; and obtain the optimized target model by optimizing the target model based on the total loss value.

Figure 7:
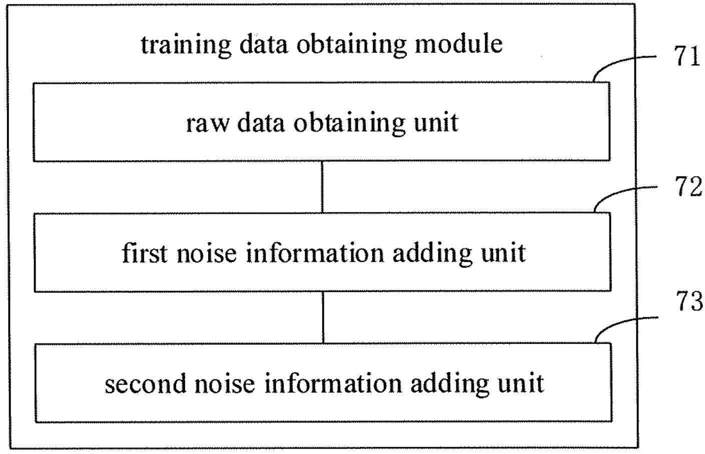
FIG. 7 is a schematic diagram of an apparatus for generating a model according to yet another embodiment of the disclosure.

In an implementation, as shown in FIG. 7, the training data obtaining module includes: a raw data obtaining unit 71, a first noise information adding unit 72 and a second noise information adding unit 73.

The raw data obtaining unit 71 is configured to obtain labeled raw data and unlabeled raw data.

The first noise information adding unit 72 is configured to obtain the labeled data by adding first noise information to the labeled raw data.

The second noise information adding unit 73 is configured to obtain the unlabeled data by adding second noise information to the unlabeled raw data.

In an implementation, the second noise information includes the first noise information and third noise information, and an interference intensity of the third noise information is greater than that of the first noise information.

The acquisition, storage and application of the personal information of the users involved in the technical solution disclosed herein comply with the relevant laws and regulations, and do not violate public order and good customs.

According to embodiments of the disclosure, the disclosure also provides an electronic device, a readable storage medium, and a computer program product.

Figure 8:
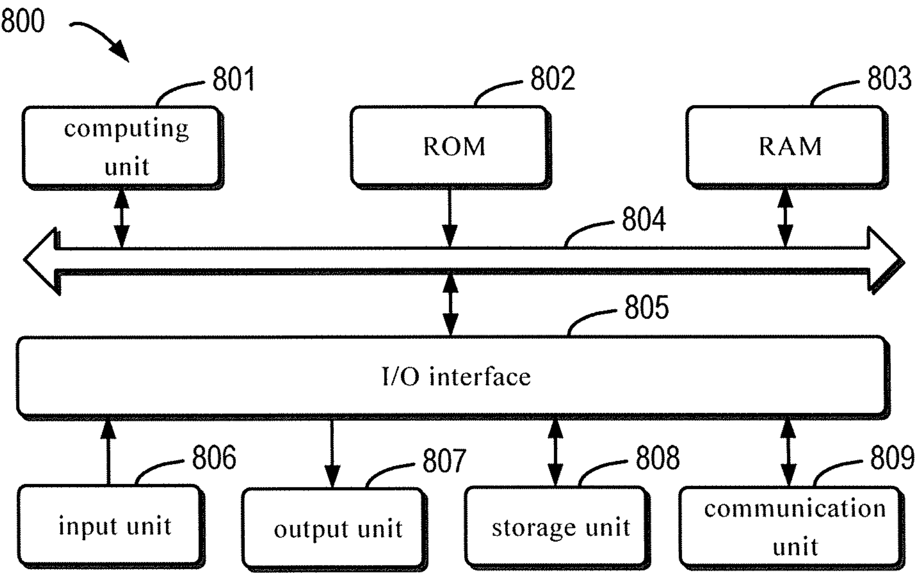
FIG. 8 is a block diagram of an electronic device used to implement the method for generating a model according to the embodiment of the disclosure.

FIG. 8 is a block diagram of an example electronic device 800 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

The embodiments of the disclosure may be applied in the field of computer technology, in particular to the field of artificial intelligence such as computer vision and deep learning.

As illustrated in FIG. 8, the device 800 includes a computing unit 801 performing various appropriate actions and processes based on computer programs stored in a Read-Only Memory (ROM) 802 or computer programs loaded from the storage unit 808 to a Random Access Memory (RAM) 803. In the RAM 803, various programs and data required for the operation of the device 800 are stored. The computing unit 801, the ROM 802, and the RAM 803 are connected to each other through a bus 804. An input/output (I/O) interface 805 is also connected to the bus 804.

Components in the device 800 are connected to the I/O interface 805, including: an inputting unit 806, such as a keyboard, a mouse; an outputting unit 807, such as various types of displays, speakers; a storage unit 808, such as a disk, an optical disk; and a communication unit 809, such as network cards, modems, and wireless communication transceivers. The communication unit 809 allows the device 800 to exchange information/data with other devices through a computer network such as the Internet and/or various telecommunication networks.

The computing unit 801 may be various general-purpose and/or dedicated processing components with processing and computing capabilities. Some examples of computing unit 801 include, but are not limited to, a Central Processing Unit (CPU), a Graphics Processing Unit (GPU), various dedicated AI computing chips, various computing units that run machine learning model algorithms, and a Digital Signal Processor (DSP), and any appropriate processor, controller and microcontroller. The computing unit 801 executes the various methods and processes described above, such as the method for generating a model. For example, in some embodiments, the method may be implemented as a computer software program, which is tangibly contained in a machine-readable medium, such as the storage unit 808. In some embodiments, part or all of the computer program may be loaded and/or installed on the device 800 via the ROM 802 and/or the communication unit 809. When the computer program is loaded on the RAM 803 and executed by the computing unit 801, one or more steps of the method described above may be executed. Alternatively, in other embodiments, the computing unit 801 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System On Chip (SOCs), Complex Programmable Logic Device (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage medium include electrical connections based on one or more wires, portable computer disks, hard disks, RAMs, ROMs, Electrically Programmable Read-Only-Memory (EPROM), flash memories, fiber optics, Compact Disc Read-Only Memories (CD-ROMs), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: Local Area Network (LAN), Wide Area Network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

According to the technical solution of the disclosure, it is possible to train the target model based on the labeled data and the unlabeled data to obtain the optimized target model, so that training of the target model despite having only a limited amount of labeled data can still be executed, thereby reducing the requirements on data labeling in the model training process, and increasing the utilization rate of the limited amount of labeled data.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for generating a model, comprising:

obtaining training data for training a target model, wherein the training data comprises labeled data and unlabeled data;

obtaining a first output result by the target model based on the labeled data;

obtaining a second output result by the target model based on the unlabeled data; and obtaining an optimized target model by optimizing the target model based on the first output result and the second output result;

wherein obtaining the optimized target model by optimizing the target model based on the first output result and the second output result, comprises: calculating a first loss value based on the first output result; calculating a second loss value based on the second output result; and obtaining the optimized target model by optimizing the target model based on the first loss value and the second loss value, wherein calculating the first loss value based on the first output result, comprises: calculating the first loss value based on a valid number of the labeled data, the first output result and labels for the labeled data, wherein the valid number of the labeled data is calculated based on part of the labeled data satisfying a preset condition, wherein the valid number (the number of representative samples) of the labeled data is $$e_c^l = \left(1 - \beta^{N_c^{s,l}}\right) / (1 - \beta),$$

wherein $\beta=(N^{s,l}-1)/N^{s,l}$, wherein the first loss value is $$CE_{softmax}\left(z^{s,l}, y^{s,l}\right) = -\frac{1-\beta}{1-\beta^{N_c^{s,l}}}\log\left(\frac{\exp\left(z_y^{s,l}\right)}{\sum_{i=0}^{C}\exp\left(z_i^{s,l}\right)}\right), N_c^{s,l}$$

is a number of labeled data for each category, $N^{s,l}$ is a total number of the labeled data, C is a number of categories, θ is variable parameter of the target model, $$x_i^l$$

is sample of labeled data, wherein the target model is configured to identify a target object, and the labeled data in the training data are images containing the target object, the label represents that the target object is present in a target object area of the image of the labeled data, the unlabeled data in the training data is an image containing the target object, and there is no label representing the target object in a target object area of the image of the unlabeled data, or the target model is configured to identify image categories and to identify image contents, the contents comprise: people, animals, plants, buildings and natural scenes, the labeled data in the training data are images that are labeled with category information, the unlabeled data in the training data are images that are not labeled with category information, or the target model is configured to process textual information, where the labeled data in the training dataset comprises text and corresponding labels, the unlabeled data comprises not labeled text.

2. The method of claim 1, wherein calculating the second loss value based on the second output result, comprises:

calculating the second loss value based on a valid number of the unlabeled data, the second output result and a weight factor for the unlabeled data, wherein the valid number of the unlabeled data is calculated based on part of the unlabeled data satisfying a preset condition.

3. The method of claim 1, wherein obtaining the optimized target model by optimizing the target model based on the first loss value and the second loss value, comprises:

obtaining a total loss value based on the first loss value and the second loss value; and obtaining the optimized target model by optimizing the target model based on the total loss value.

4. The method of claim 1, wherein obtaining the training data for training the target model, comprises:

obtaining labeled raw data and unlabeled raw data;

obtaining the labeled data by adding first noise information to the labeled raw data; and obtaining the unlabeled data by adding second noise information to the unlabeled raw data.

5. The method of claim 4, wherein the second noise information comprises the first noise information and third noise information, and an interference intensity of the third noise information is greater than an interference intensity of the first noise information.

6. An electronic device, comprising:

at least one processor; and a memory communicatively coupled to the at least one processor; wherein, the memory stores instructions executable by the at least one processor, and when the instructions are executed by the at least one processor, the at least one processor is configured to:

obtain training data for training a target model, wherein the training data comprises labeled data and unlabeled data;

obtain a first output result by the target model based on the labeled data;

obtain a second output result by the target model based on the unlabeled data; and obtain an optimized target model by optimizing the target model based on the first output result and the second output result;

wherein obtaining the optimized target model by optimizing the target model based on the first output result and the second output result, comprises: calculating a first loss value based on the first output result; calculating a second loss value based on the second output result; and obtaining the optimized target model by optimizing the target model based on the first loss value and the second loss value, wherein calculating the first loss value based on the first output result, comprises: calculating the first loss value based on a valid number of the labeled data, the first output result and labels for the labeled data, wherein the valid number of the labeled data is calculated based on part of the labeled data satisfying a preset condition, wherein the valid number (the number of representative samples) of the labeled data is $$e_c^l = \left(1 - \beta^{N_c^{s,l}}\right) / (1 - \beta),$$

wherein $\beta=(N^{s,l}-1)/N^{s,l}$, wherein the first loss value is $$CE_{softmax}(z^{s,l}, y^{s,l}) = -\frac{1-\beta}{1-\beta^{N_c^{s,l}}} \log\left(\frac{\exp(z_y^{s,l})}{\sum_{i=0}^{C} \exp(z_i^{s,l})}\right), N_c^{s,l}$$

is a number of labeled data for each category, $N^{s,l}$ is a total number of the labeled data, C is a number of categories, θ is variable parameter of the target model, $$x_i^l$$

is sample of labeled data, wherein the target model is configured to identify a target object, and the labeled data in the training data are images containing the target object, the label represents that the target object is present in a target object area of the image of the labeled data, the unlabeled data in the training data is an image containing the target object, and there is no label representing the target object in a target object area of the image of the unlabeled data, or the target model is configured to identify image categories and to identify image contents, the contents comprise: people, animals, plants, buildings and natural scenes, the labeled data in the training data are images that are labeled with category information, the unlabeled data in the training data are images that are not labeled with category information, or the target model is configured to process textual information, where the labeled data in the training dataset comprises text and corresponding labels, the unlabeled data comprises not labeled text.

7. The electronic device of claim 6, wherein the processor is configured to:

calculate the second loss value based on a valid number of the unlabeled data, the second output result and a weight factor for the unlabeled data, wherein the valid number of the unlabeled data is calculated based on part of the unlabeled data satisfying a preset condition.

8. The electronic device of claim 6, wherein the processor is configured to:

obtain a total loss value based on the first loss value and the second loss value; and obtain the optimized target model by optimizing the target model based on the total loss value.

9. The electronic device of claim 6, wherein the processor is configured to:

obtain labeled raw data and unlabeled raw data;

obtain the labeled data by adding first noise information to the labeled raw data; and obtain the unlabeled data by adding second noise information to the unlabeled raw data.

10. The electronic device of claim 9, wherein the second noise information comprises the first noise information and third noise information, and an interference intensity of the third noise information is greater than an interference intensity of the first noise information.

11. A non-transitory computer-readable storage medium storing computer instructions, wherein the computer instructions are configured to cause a computer to implement a method for generating a model, the method comprising:

obtaining training data for training a target model, wherein the training data comprises labeled data and unlabeled data;

obtaining a first output result by the target model based on the labeled data;

obtaining a second output result by the target model based on the unlabeled data; and obtaining an optimized target model by optimizing the target model based on the first output result and the second output result;

wherein obtaining the optimized target model by optimizing the target model based on the first output result and the second output result, comprises: calculating a first loss value based on the first output result; calculating a second loss value based on the second output result; and obtaining the optimized target model by optimizing the target model based on the first loss value and the second loss value, wherein calculating the first loss value based on the first output result, comprises: calculating the first loss value based on a valid number of the labeled data, the first output result and labels for the labeled data, wherein the valid number of the labeled data is calculated based on part of the labeled data satisfying a preset condition, wherein the valid number (the number of representative samples) of the labeled data is $$e_c^l = \left(1 - \beta^{N_c^{s,l}}\right) / (1 - \beta),$$

wherein $\beta=(N^{s,l}-1)/N^{s,l}$, wherein the first loss value is $$CE_{softmax}(z^{s,l}, y^{s,l}) = -\frac{1-\beta}{1-\beta^{N_c^{s,l}}}\log\left(\frac{\exp(z_y^{s,l})}{\sum_{i=0}^{C}\exp(z_i^{s,l})}\right),$$

$$N_c^{s,l}$$

is a number of labeled data for each category, $N^{s,l}$ is a total number of the labeled data, C is a number of categories, θ is variable parameter of the target model, $$x_i^l$$

is sample of labeled data, wherein the target model is configured to identify a target object, and the labeled data in the training data are images containing the target object, the label represents that the target object is present in a target object area of the image of the labeled data, the unlabeled data in the training data is an image containing the target object, and there is no label representing the target object in a target object area of the image of the unlabeled data, or the target model is configured to identify image categories and to identify image contents, the contents comprise: people, animals, plants, buildings and natural scenes the labeled data in the training data are images that are labeled with category information, the unlabeled data in the training data are images that are not labeled with category information, or the target model is configured to process textual information, where the labeled data in the training dataset comprises text and corresponding labels, the unlabeled data comprises not labeled text.

12. The storage medium of claim 11, wherein calculating the second loss value based on the second output result, comprises:

calculating the second loss value based on a valid number of the unlabeled data, the second output result and a weight factor for the unlabeled data, wherein the valid number of the unlabeled data is calculated based on part of the unlabeled data satisfying a preset condition.

13. The storage medium of claim 11, wherein obtaining the optimized target model by optimizing the target model based on the first loss value and the second loss value, comprises:

obtaining a total loss value based on the first loss value and the second loss value; and obtaining the optimized target model by optimizing the target model based on the total loss value.

14. The storage medium of claim 11, wherein obtaining the training data for training the target model, comprises:

obtaining labeled raw data and unlabeled raw data;

obtaining the labeled data by adding first noise information to the labeled raw data; and obtaining the unlabeled data by adding second noise information to the unlabeled raw data.

* * * * *